Feb. 10, 1959 J. B. LE POOLE 2,873,378
METHOD OF EXAMINING THE QUALITY OF ELECTRON-OPTICAL
IMAGES AND DEVICES FOR CARRYING OUT THIS METHOD
Filed June 20, 1955 2 Sheets-Sheet 1

INVENTOR
JAN BART DE POOLE
BY
AGENT

2,873,378

METHOD OF EXAMINING THE QUALITY OF ELECTRON-OPTICAL IMAGES AND DEVICES FOR CARRYING OUT THIS METHOD

Jan Bart Le Poole, Delft, Netherlands, assignor, by mesne assignments, to North American Philips Company, Inc., New York, N. Y., a corporation of Delaware Application June 20, 1955, Serial No. 516,727

Claims priority, application Netherlands July 15, 1954

6 Claims. (Cl. 250—49.5)

In U. S. patent specification No. 2,485,754 a method of sharp adjustment of the image of an electron microscope has been described. In this method the direction of the ray beam is rapidly changed periodically so that the image producing ray cones are apparently widened. Thus, the quality of a sharp adjusted image is not changed, but the lack of definition of an incorrectly adjusted image is temporarily increased and thus made more perceptible.

The invention extends this method so that the position of the image plane can be determined at a given lens power with a higher degree of accuracy while by varying the focal length of the lens the image can be located in the required plane. According to the invention an electrical measuring device takes over the function of the eye in sharp adjustment. This provides not only a higher degree of accuracy but also permits adjustment at an intensity of the rays which is too weak for visual observation.

According to the invention, while the direction of the image producing ray-cones is rapidly changed periodically, the electron current is measured which passes through a small part of the pick-up surface, which part contains the edge of an image detail, which edge makes an angle with the direction in which the ray beam moves over the pick-up surface. Hereinafter the said small part of the pick-up surface will be referred to as "measuring area." When the image is not sharp, the edge of the image detail moves over the measuring area. This produces a periodic variation of the measured electron current. By varying the distance between the pick-up surface and the lens or by varying the focal length of the lens this periodic variation is increased or decreased. The arrangement may be such that the variation is a minimum (in a perfect lens it is zero). This provides the optimum definition. It will be understood that with a given lens adjustment the current variation will be largest and the measurement will be most correct, when the edge of the image detail is a straight line at right angles to the direction of displacement of the beam and the measuring surface is elongated and also extends at right angles to this displacement.

The electron current passing through the measuring area is very weak so that direct amplification of the current variations will give rise to inconvenient noise. Consequently, preferably use is made of an electron multiplier comprising a photocathode for measuring.

As will be described hereinafter, the invention also relates to a method of examining electron-optical lenses concerning astigmatism.

The invention will be described more fully with reference to the accompanying diagrammatic drawing, in which.

Figure 4:
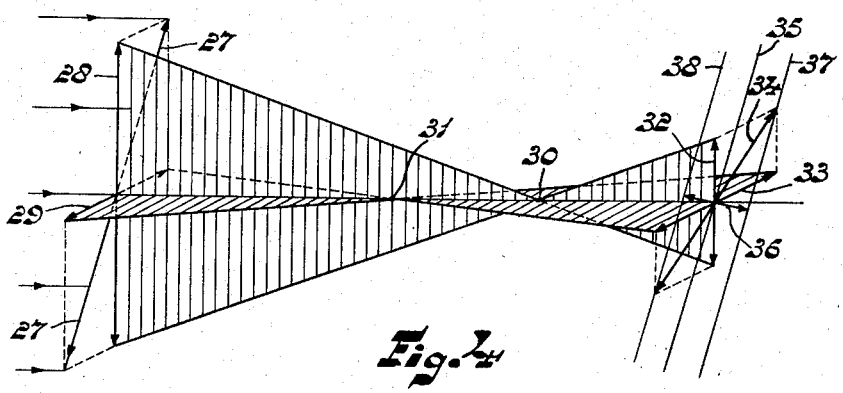
Figure 5:
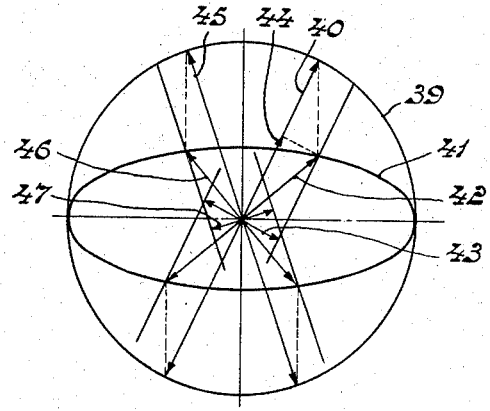
Figure 6:
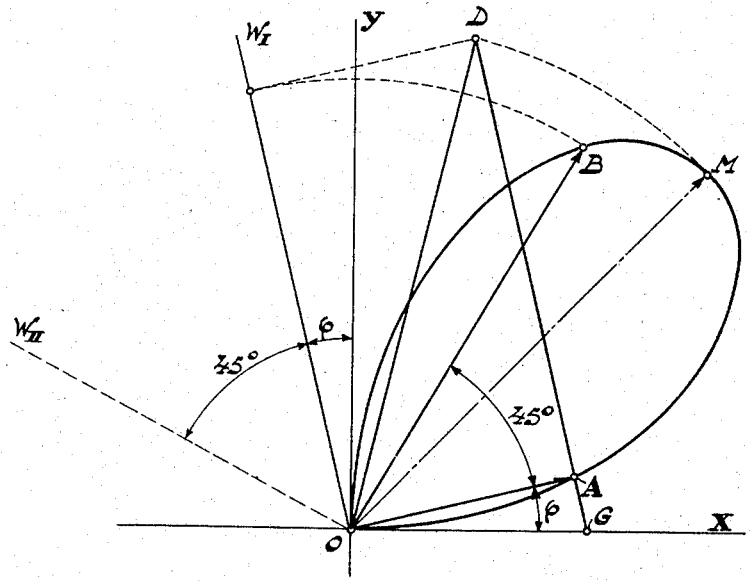

Figures 4, 5 and 6 relate to the use of the invention for determining the astigmatism of an electron-optical lens.

Figure 1:
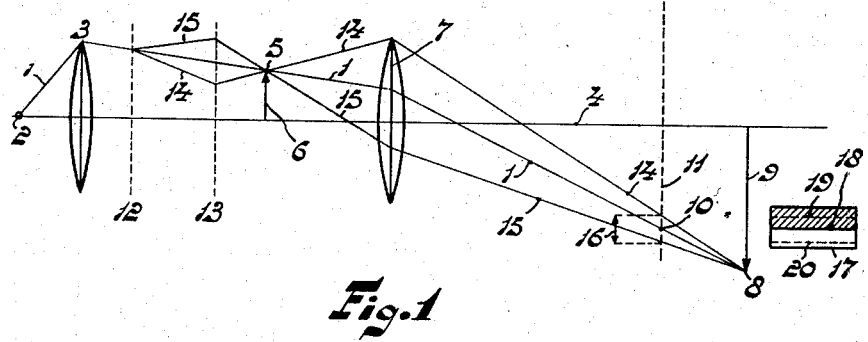
Fig. 1 illustrates the effect of the rapid periodic displacement of the ray cones.

Fig. 1 shows the path of an electron beam in an electron-optical system from its source to the image. Since in these systems the rays which pass through a point of the object usually substantially do not diverge, in Figure 1 the beam for the sake of clarity is shown as a line 1 emanating from a point emitter 2. That ray has been chosen which, after having been refracted in the condenser 3 towards the optical axis 4, strikes the extreme point 5 of the object 6. Subsequently the ray is directed by the objective 7 to the corresponding point 8 of the image 9. Owing to the slenderness of the beam its sectional area is very small in the point 10 in which the line 1 intersects the surface intended for the projection of the image, for example a fluorescent screen 11. Consequently, if the surface 11 is not spaced away from the image by a large distance, the eye is not able to ascertain that in this plane no sharp image is produced.

As has already been described in U. S. patent specification No. 2,485,754, the ray may be caused to impinge on the pick-up surface 11 at a different angle. For this purpose the beam is refracted when passing through a plane 12 and refracted back through a larger angle when passing through a plane 13 so that it again strikes the initial object point 6. If the beam is thus periodically deflected so that it moves between the lines 14 and 15, the point of intersection with the screen 11 reciprocates through a distance equal in length to the line 16 and the sectional area of the beam is apparently increased so that its perceptibility is improved.

It is assumed that the periodic motion of the beam 1 is effected between lines 14 and 15 in the plane of the drawing. The pick-up screen 11 may have a slit-shaped aperture formed in it the direction of length of which is at an angle to the direction in which the beam oscillates. In Figure 1 this slit is shown as a rectangle 17 viewed in the direction of the optical axis, the longer sides being at right angles to the direction of oscillation. According to the invention the edge of an image detail is projected onto this slit, which edge is also at an angle, preferably at right angles, to the direction of oscillation. The edge is designated 18. Owing to the periodic rapid displacement of the electron beam the edge 18 oscillates through a distance equal in length to the line 16 between the broken lines 19 and 20. In the shaded part of the slit the electron current is zero, at least considerably weaker than in the non-shaded part. The total value of the current passed by the slit will vary with the position of the edge 18 and assume a minimum value, when the edge is coincident with the line 20, and a maximum value, when the edge is coincident with the line 19. Thus, the current passing through the measuring area comprises an alternating component which can be amplified and measured and which decreases according as the pick-up surface approaches the actual image plane. The measurement will be most accurate if the measuring area and the image edge are both at right angles to the direction of oscillation.

Figure 2:
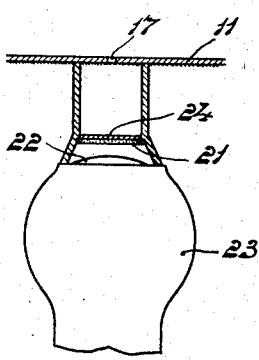
Fig. 2 shows a detail of the input part of the electron multiplier for use in carrying out the method in accordance with the invention.

In order to measure this alternating current component according to the invention a fluorescent screen 21 (Fig. 2) can be arranged behind an aperture 17 in the pick-up screen 11 (for example the fluorescent screen of an electron microscope), said aperture constituting the measuring area, while the screen 21 must be sufficiently large to catch the entire electron current passing through the slit 17 and co-operates with a photo-cathode 22 of an electron multiplier 23. On the side nearer the electron source the screen 21 is coated with a layer of metal 24, for example an aluminium layer, which must reflect the light from the screen 21 and intercept the light coming from the other side, for example from the fluorescent pick-up screen 11.

Figure 3:
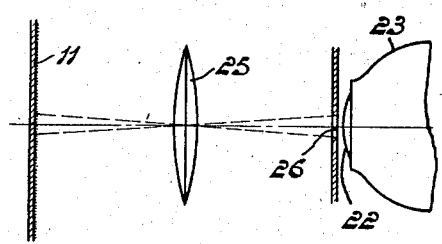
Fig. 3 illustrates an alternative method to transmit the signal to be measured to the electron multiplier.

Alternatively, in a system in accordance with the invention, the electron multiplier may be excited in that a small part equal in size to the measuring area of the fluorescent screen 11 is projected by means of an optical system, for example a lens 25 (Fig. 3), onto a slit 26 behind which the photo-cathode 22 of the electron multiplier 23 is arranged. This does not require the production of a sharp image by the optical system 25. This method is of particular advantage in electron microscopes comprising a transparent screen, since in this event the entire measuring system may be arranged outside the microscope adjacent the pick-up screen so that the microscope need not be modified.

The frequency at which the electron beam oscillates and consequently also the frequency of the alternating current required to be measured may be chosen at random. Thus amplification may be effected by means of a selective and consequently sensitive amplifier.

From the measured alternating current data can be derived concerning the astigmatism of the objective used. As a result the method in accordance with the invention can be used for testing lenses and lens-systems. This fact can be utilized in the manufacture of electron microscopes to test lenses prior to mounting them in the microscope. By removing or compensating any asymmetry which might cause astigmatism which is found by carrying out the measurement in accordance with the invention, in many cases an initially unsuitable lens can be corrected.

Astigmatism of a lens means that the lens does not on either side have a single focal point in the optical axis but two points each associated with one of two planes intersecting in the optical axis at right angles. Thus, a point of the optical axis produces a line image in two planes at right angles to the axis and the two line images thus formed are skew lines at right angles to each other. In other planes at right angles to the axis an image of the same point of the axis is produced in the shape of an ellipsoidal area. Consequently in an astigmatic lens no point of the object produces a sharp image.

When a beam emanating from a point of the optical axis is caused to trace out a conical surface, i. e. the beam has two simultaneous oscillating motions at right angles to each other and at the same amplitude but with a phase difference of 90° imparted to it, the beam, if the lens does not exhibit astigmatism, beyond the lens traces out a circle on a plane at right angles to the axis, which circle changes to a point in the image plane. In an astigmatic lens however, the beam emanating from the lens does not trace out a circle but an ellipse. This ellipse changes to a straight line in two pick-up surfaces.

By rotating the measuring area until the deflection which is observed exhibits an extreme value the direction of the astigmatism can be ascertained. By shifting the measuring area in the direction of the axis the position can then be ascertained in which the oscillation vanishes in one of these directions. This permits of ascertaining the position of the image lines which, when the beam is incident in a direction parallel to the axis, constitute the focal lines.

When carrying out these measurements various methods may be used to accelerate the measurement. Thus, instead of using a slit-shaped measuring area use may be made of two measuring areas which enclose a given angle with one another. If this angle is a right angle, the amplified signal can be supplied to two detectors one of which is sensitive only to the phase of the alternating voltage which is derived from one measuring area while the other is sensitive only to the phase of the alternating voltage which is derived from the other measuring area. Thus, two oscillations at right angles to each other are measured simultaneously.

If during measurement the lens power or the electron velocity are changed, the accuracy of the result is adversely affected. A method which permits of eliminating this influence will be explained with reference to Figures 4, 5 and 6.

In Figure 4 reference numeral 27 designates a direction line passing through the optical axis in a plane at right angles to this axis. Along this line a beam emanating from a point of the axis, which point may be infinitely remote, moves periodically. The oscillation of this beam can be resolved into two components 28 and 29 at right angles to each other in the directions of the astigmatism. The image point 30 (which may be a focal point) is associated with the oscillation 28, the image point 31 (which may be a focal point) is associated with the oscillation 29. For convenience's sake the oscillation 28 is assumed to be vertical while the oscillation 29 is assumed to be horizontal. The plane figures which are swept by the beam which oscillates vertically and horizontally are shown shaded in the figure. In the pick-up surface the oscillation 28 produces a vertical oscillation 32 of the point of intersection of the beam with this surface, while the oscillation 29 produces a horizontal oscillation 33. The oscillations 32 and 33 are compounded to form an oscillation 34 which, due to the astigmatism, is at an angle to the direction 35 of the initial oscillation 27. In can be proved that the component 36 of the oscillation 34 at right angles to the direction 35 is much less dependent upon the lens power than the component of 34 in the direction 35. This is due to the fact that the distance between the points 30 and 31 expressed as a percentage of the mean focal length is constant. When the focal length is changed by variation in the electric quantities which determine the refractive power of the lens, the end of vector 34 moves along a line (37, 38) which is substantially parallel to 35.

Fig. 5 shows a circle 39 which the point of intersection of the beam would trace out upon the pick-up surface if the beam incident into the lens should perform a circular movement about the axis and the point 30 should be shifted to coincide with the point 31 (no astigmatism). In this event the oscillation 27 would produce an oscillation 40 in the initial direction. Due to the astigmatism, however, the circle 39 is changed to an ellipse 41 and the oscillation 27 produces on the pick-up surface an oscillation which is shown by 42. Of this oscillation the component 43 at right angles to 40 is slightly and the component 44 highly dependent upon the lens adjustment. With a vertical oscillation the component 43 assumes zero value, and likewise with a horizontal one. An initial oscillation at right angles to 27 would produce the same value for the component at right angles thereto. However, if now a second measurement is taken with the use of an oscillation in the direction 45, which oscillation encloses an angle of 45° with 40 (27) and produces the oscillation 46 on the pick-up surface, the component 47 of 46 at right angles to the direction 45 is obtained which likewise varies only slightly with variation in the refractive power of the lens. By means of the two components 43 and 47 obtained by carrying out two measurements with the use of two oscillations at an angle of 45° and with a position of the measuring area each time in the direction of the oscillations the value and direction of the astigmatism can be ascertained as follows:

When 27 is rotated through 360° the vector 36 in Fig. 4 describes a figure consisting of four closed curves, for it is proportional to the product obtained by multiplying the sine and cosine of the angle enclosed between 27 and 29. One of the curves of this figure is shown in Fig. 6.

It is assumed that the vectors OA and OB which enclose an angle of 45° have been determined by the measurement. The associated directions of the vector 27 are designated $W_I$ and $W_{II}$. These directions consequently also enclose an angle of 45°. On $W_I$ a length OC equal to OB is marked. OA and OC are adjacent sides of the rectangle OADC. The angle enclosed by OA and the horizontal axis X is called $\varphi$, so that the angle enclosed by $W_I$ and the vertical axis Y is also $\varphi$. If the angle DOC can be determined the position of the co-ordinates is known.

$$\tan DOC = \frac{CD}{CO} = \frac{OA}{OB}$$

Now $OA = K \sin \varphi \cos \varphi$ and $OB = K \sin (\varphi + 45°) \cos (\varphi + 45°)$. In this expression K is a constant which depends on the length of the vector 27 and the axial distances in Fig. 4. Consequently $$\tan DOC = \frac{\sin \varphi \cos \varphi}{\sin (\varphi + 45° \text{ C.}) \cos (\varphi + 45°)} =$$

$$\frac{\sin \varphi \cos \varphi}{(\sin \varphi \cos 45° + \cos \varphi \sin 45°)(\cos \varphi \cos 45° - \sin \varphi \sin 45°)}$$

$$\frac{2 \sin \varphi \cos \varphi}{(\sin \varphi + \cos \varphi)(\cos \varphi - \sin \varphi)} =$$

$$\frac{2 \sin \varphi \cos \varphi}{(\cos^2 \varphi - \sin^2 \varphi)} \cdot \frac{\sin^2 \varphi}{\cos^2 \varphi} = \tan 2\varphi$$

Consequently the angle $DOC = 2\varphi$, so that the Y axis is the bisector of the angle COD and thus the co-ordinates are determined.

It will be seen from the figure that $OD = DG = DA + AG = OC + AG = OB + OA \tan \varphi$. Consequently $OD = K \sin (\varphi + 45°) \cos (\varphi + 45°) + K \tan \varphi \sin \varphi \cos \varphi = \frac{1}{2} K (\cos^2 \varphi - \sin^2 \varphi) + K \sin^2 \varphi = \frac{1}{2} K (1 - 2 \sin^2 \varphi) + K \sin^2 \varphi = \frac{1}{2} K - K \sin^2 \varphi + K \sin^2 \varphi = \frac{1}{2} K$.

This is the maximum value OM which the vector 36 assumes when rotated about the point O, i. e. $K \sin 45° \cos 45°$. Consequently, the diagonal OD represents the value of the entire astigmatism.

Without the stability of the microscope having to satisfy exacting requirements a sufficient period of time is available for carrying out the measurement. A measuring time of for example 1 minute forms no objection to a high sensitivity of the arrangement. In a suitable embodiment the measuring area is 20 mms. long and for testing the image definition is 1.5 to 2 mms. wide. For determining the astigmatism with the use of two directions of oscillation at an angle of 45° to one another a narrower slit, for example a slit 0.5 mm. wide, is to be preferred. If as an object a preparation is used which withstands an intense irradiation, an astigmatism of 50 A. (distance between the focal lines) can be measured. Consequently the measuring method in accordance with the invention is at least ten times more sensitive than the conventional methods. Use may be made of any conventional deflecting systems, both electromagnetic and electrostatic systems, for example, the system mentioned in U. S. patent specification No. 2,485,754.

What is claimed is:

1. A device for determining the image plane of an electron-optically produced image of an object comprising, means to project a beam of electrons striking a given region of the object exhibiting a variation in contrast different from that of an adjacent region, means to deflect the electron beam so as to vary in succession the directions in which the beam strikes said region of the object thereby causing movement of the image of said region in a plane non-coincident with the image plane, a boundary element in said non-coincident plane having an edge forming an angle with the direction of movement of said image region in said non-coincident plane, and means to convert the image in said non-coincident plane as it traverses said boundary into an electrical signal having variations indicative of the extent of movement of said image region in said non-coincident plane.

2. A device for determining the image plane of an electron-optically produced image of an object comprising, means to project a beam of electrons striking a given region of the object exhibiting a variation in contrast different from that of an adjacent region, means to deflect the electron beam so as to vary in succession the directions in which the beam strikes said region of the object thereby causing movement of the image of said region in a plane non-coincident with the image plane, a boundary element in said non-coincident plane having an edge perpendicular to the direction of movement of said image region in said non-coincident plane, and means to convert the image in said non-coincident plane as it traverses said boundary into an electrical signal having variations indicative of the extent of movement of said image region on said non-coincident plane.

3. A device for determining the image plane of an electron-optically produced image of an object comprising, means to project a beam of electrons striking a given region of the object exhibiting a variation in contrast different from that of an adjacent region, means to deflect the electron beam so as to vary in succession the directions in which the beam strikes said region of the object thereby causing movement of the image of said region in a plane non-coincident with the image plane, a boundary element in said non-coincident plane having an edge forming an angle with the direction of movement of said image region in said non-coincident plane, a fluorescent screen for converting the moving electron image in the non-coincident plane to a visible image, and an electron multiplier having a photocathode facing said fluorescent screen to convert said image as it traverses said boundary into an electrical signal having variations indicative of the extent of movement of said image region in said non-coincident plane.

4. A device for determining the image plane of an electron-optically produced image of an object comprising means to project a beam of electrons striking a given region of the object exhibiting a variation in contrast different from that of an adjacent region, means to deflect the electron beam so as to vary in succession the directions in which the beam strikes said region of the object thereby causing movement of the image of said region in a plane non-coincident with the image plane, a fluorescent screen for producing a projected image of said object, said screen having a slit therein for the passage of the electron beam, said slit extending in a direction forming an angle with the direction of movement of said image region in said non-coincident plane, a second fluorescent screen positioned on the side of said first fluorescent screen remote from the object and in the path of said electron beam passing through said slit, and means to convert the moving image produced on said second fluorescent screen into an electrical signal having variations indicative of the extent of movement of said image on said second fluorescent screen.

5. A device for determining the image plane of an electron-optically produced image of an object comprising, means to project a beam of electrons striking a given region of the object exhibiting a variation in contrast different from that of an adjacent region, means to deflect the electron beam so as to vary in succession the directions in which the beam strikes said region of the object thereby causing movement of the image of said region in a plane non-coincident with the image plane, a fluorescent screen for producing a visible image of the projected electron image of said object, a diaphragm in said non-coincident plane having a slit-shaped aperture forming an angle with the direction of movement of said image region in said non-coincident plane, an optical system for projecting said image region onto said diaphragm, and means to convert the image in said non-coincident plane as it traverses said slit-shaped aperture into an electrical signal having variations indicative of the extent of movement of said image region in said non-coincident plane.

6. A device for determining astigmatism in an electron-optical lens comprising, means to project a beam of electrons from a point on the optical axis of said lens, means to periodically deflect the electron beam about said optical axis to thereby trace out a conical surface, a boundary element beyond the lens having an edge which is traversed by said electron beam in each of two positions at right angles to each other, means to convert the projected electron beam after traversing said boundary element to a visible image, and means to convert the visible image into a signal having variations indicative of the extent of astigmatism in said lens in either of said positions.

References Cited in the file of this patent
UNITED STATES PATENTS

| | | |
|---|---|---|
| 2,267,961 | Tillyer et al. | Dec. 30, 1941 |
| 2,385,503 | Glasser | Sept. 25, 1945 |
| 2,485,754 | Le Poole | Oct. 25, 1949 |
| 2,524,807 | Kallman | Oct. 10, 1950 |
| 2,705,901 | Sherwin | Apr. 12, 1955 |